United States Patent [19]

Kaes

[11] Patent Number: 5,028,252

[45] Date of Patent: Jul. 2, 1991

[54] METHOD OF AND COMPOSITION FOR THE FERTILIZATION, DETOXIFICATION AND DEACIDIFICATION OF SOIL

[75] Inventor: Gertrude Kaes, Vienna, Austria

[73] Assignee: Lang & Co., Chemisch-Technische Produkte Kommanditgesellschaft, Mauerbach, Austria

[21] Appl. No.: 908,948

[22] Filed: Sep. 16, 1986

Related U.S. Application Data

[63] Continuation-in-part of Ser. No. 726,592, Apr. 23, 1985, abandoned.

[30] Foreign Application Priority Data

Apr. 26, 1984 [AT] Austria .................................. 1393/84

[51] Int. Cl.$^5$ .......................... C05C 9/00; C05B 13/06
[52] U.S. Cl. ........................................... 71/29; 71/36; 71/42; 71/43; 71/903
[58] Field of Search ....................... 71/36, 903, 35, 34, 71/904, 29, DIG. 2

[56] References Cited

U.S. PATENT DOCUMENTS

| 3,574,591 | 4/1971 | Lyons et al. | 71/36 |
| 4,008,065 | 2/1977 | Hauschild | 71/34 |
| 4,033,747 | 7/1977 | Young | 71/28 |
| 4,038,064 | 7/1977 | Clapp et al. | 71/903 |
| 4,248,843 | 3/9181 | Williams et al. | 71/34 |
| 4,396,412 | 8/1983 | Heller et al. | 71/904 |

FOREIGN PATENT DOCUMENTS

| 159607 | 10/1985 | European Pat. Off. | 71/29 |
| 78992 | 5/1984 | Japan | 71/36 |

Primary Examiner—Ferris H. Lander
Attorney, Agent, or Firm—Herbert Dubno

[57] ABSTRACT

A fertilizer composition and method for the detoxification and deacidification of soil threatened by acidic deposits which comprises at least one alkali-reactive component, selected from the group which consists of calcium, magnesium, potassium, sodium, ammonium and ammonia compounds in soil neutralizing amounts and at least one water soluble pyrophosphate or polyphosphate capable of forming water insoluble salts with aluminum and heavy metals of a similar magnitude as the diphosphates.

2 Claims, No Drawings

METHOD OF AND COMPOSITION FOR THE FERTILIZATION, DETOXIFICATION AND DEACIDIFICATION OF SOIL

This is a continuation-in-part of co-pending application Ser. No. 726,592 filed on Apr. 23, 1985 and now abandoned.

FIELD OF THE INVENTION

My present invention relates to a method of and a composition for the detoxification, deacidification and the fertilization of soil which may be contaminated with acid deposits and, possibly toxic heavy metals. More particularly, the invention relates to a fertilizer capable of the detoxification and deacidification of acidic soils and especially soils contaminated by acid delivered from the atmosphere and in which the fertilizer contains alkali-reactive calcium and/or magnesium and/or potassium and/or sodium and/or ammonium compounds or ammonia. The invention also relates to a method of fertilizing acidic and acid-contaminated soils, a method of detoxification these soils and a method of deacidifying sam utilizing the composition of the invention.

BACKGROUND OF THE INVENTION

Soil contamination by deposits from the atmosphere and especially acidic components which deposit directly, indirectly or in a form in which the acid component is generated upon the ground, has long been recognized as a serious problem. These acidic components arise in the atmosphere in various forms, primarily as acid-forming gases such as sulfur oxides and nitrogen oxides. However, they also may be emitted into the atmosphere and deposited from the atmosphere or may be present in the atmosphere as free acids, such as hydrochloric acid, sulfuric acid or nitric acid and hydrogen fluoride.

The deposits collect upon the ground in gas, liquid or particle form and may be carried onto the ground with rain, snow or with mixed wet precipitation. As early as 1872, Smith was able to describe the phenomenon of and coin the term "acid rain".

Measurements taken of the soil at various locations has shown an increasing acidity which has been traced to increasing acidity of the atmosphere and an increase in acid emissions into the atmosphere.

The primary sources of such acidic deposits are sulfur-dioxide ($SO_2$) and the nitrogen oxide ($NO_x$) compounds which are generated in the combustion of gaseous, liquid and fossil fuels and organic fuels generally, utilizing air. The acid compounds are also released in less quantities from metallurgical plants during the roasting of ores and from various chemical process or other emissions.

In the northeastern United States, acid formers are constituted of 65% by volume of sulfur-containing acid compounds and 30% nitrogen-containing acid compounds, the balance of 5% being hydrogen chloride or hydrochloride acid. This ratio has tended to shift in favor of increasing proportions of nitrogen-containing acid as emission control standards are increasingly applied more successfully to the combustion of sulfur-containing fuels, thereby reducing the sulfur dioxide emissions or at the very least, stabilizing them.

Typical measurements in Europe for the pH value of rain range from 3.8 to 4.8. Hoarfrost in municipal areas has been shown to have a pH value of 3.2 and fog in industrial centers a pH value of 3.0. Pure water in equilibrium with the average of carbon dioxide content of air (0.03% by volume) has a pH value of 5.6. From these values it will be apparent that emissions have given rise to a sharp increase in the acidity of deposits from the atmosphere upon the ground. These acidification deposits have been found having a direct and indirect effect on vegetation. In various areas of Central Europe for example, the pH value of the ground has diminished to 4.3 whereas in northeastern North America a pH value as low as 4.1 has been measured.

In practice, pH values of 5.6 to substantially higher and even neutral values are preferred for most plant growth.

A direct result of the acidification of the soil and the ground environment is the leaching out of valuable nutrients. There is also at least a possible direct effect on the exposed surfaces of plant tissue. This has been attributed primarily to the effect of sulfur dioxide, nitrogen oxide and gaseous fluoride compounds.

For example, in pine and evergreen forests the life of needles has been sharply reduced, regeneration of replenishment of needles has been minimized and a filter effect in the crown region of the plant has shown that acid rain is able to reduce the pH of the soil in such stands of evergreen well below the pH values in open fields. This has been attributed at least in part to the fact that in evergreen stands and the like, dry-deposited acid formers can be washed out additionally.

The high hydrogen ion concentrations, apart from causing tissue damage can also mobilize surface deposits of heavy metals which can themselves be detrimental to plants. In hilly terrain at levels of 600 to 800 meters above the base of a mountain or hill, because of the solar radiation effect and the photo-oxidation of $NO_x$ by ozone, peroxyacyl nitrate forms, where there is more than about 0.00005 mg $SO_2/m^3$ of air, the plants are more strongly damaged than with the $NO_x$ and $SO_2$ alone.

An indirect effect upon the ground, of the acidic deposit is the leaching of calcium, magnesium and potassium, all important plant nutrients, from the soil.

Simultaneously, toxic elements (heavy metals) and aluminum may be mobilized to cause substantial root damage. The reduction of the pH value of the ground and the increase in the concentration of available heavy metal ions, have a negative effect on the growth rate and on the activation of soil microorganisms which are essential for effective plant growth.

The detrimental effect of such acid deposits, in sum, can be manifested in massive forest death, which has already been observed throughout at least northeastern North America and in Europe. More recently, however, the effect has also been observed in the reduced growth rate of crop plants such as tomatoes and damage to other plantings such as barley.

OBJECTS OF THE INVENTION

It is, therefore, the principal object of the present invention to provide an improved composition for the fertilization, detoxification and deacidification of the soil.

Another important object of this invention is to provide a method of treating the soil so as to fertilize, detoxify and deacidify it.

Another more specific object of the invention is to provide a method of treating the soil and a composition for this purpose which can counteract the aforementioned leaching of calcium compounds primarily and which can provide a buffer against loss of potassium and magnesium compounds or compensate for losses thereof and which can also inactivate water-soluble heavy metal and aluminum compounds that may be toxic to plants and ground water and, therefore, to reactivate the soil microorganisms or to allow the natural activation of such microorganisms.

DESCRIPTION OF THE INVENTION

These objects and others which will be come apparent hereinafter are attained in accordance with the invention by providing a fertilizing agent which is both alkaline in nature, i.e. is adapted to raise the pH because of water-soluble substances contained therein and which, in addition, contains water-soluble pyrophosphate (=diphosphate) or at least one other polyphosphate which is capable of binding aluminum and heavy metals ions in an analogous magnitude as water-insoluble aluminum and heavy-metal diphosphates and which can, if desired, include plant nutrients as well.

According to the present invention, the method comprises applying to the ground at least one alkali reactive calcium and/or magnesium and/or potassium and/or sodium and/or ammonium compound or ammonia and at least one water soluble pyrophosphate, preferably potassium diphosphate and/or other polyphosphate which is water soluble to allow the polyphosphate (this term being utilized to include pyrophosphate as well) to form an insoluble aluminum salt and water insoluble metal salt of a heavy metal. The weight ratio of the alternate component, consisting of one or more of the alkali-reactive compounds, to the pyrophosphate component, including one or more of the pyrophosphates, should be at least 4:1. The method can also include applying to the ground other nutrients which can be incorporated in the composition.

According to the invention, therefore, a fertilization is effected, for instance, by means of alkali-reactive and acid-neutralizing calcium compounds. Preferably, calcium carbonate and/or calcium oxide and/or calcium hydroxide can be used. These calcium compounds can be partly or completely replaced by analogous magnesium compounds in accordance with soil requirements and based upon availability.

Typical neutralizing agents which may be used include natural calcium compounds such as ground or milled limestone, calcium carbonate, milled or ground lime-containing plant materials such as algae lime; chemically produced or converted lime products such as deadburned lime, slaked lime, lump lime, and mixed limes.

Industrial limes such as metallurgical and converter lime and residue lime from various metallurgical processes and chemical process may be used as well.

I can also use lime-containing soil materials such as clay lime and marly limestone. Lime mixtures with organic fertilizers may also be used, for example, lime-treated manures.

Basic fertilizers with a lime effect such as calcium cyanamide may also be used.

To increase the pH value of the soil, for each unit of pH increase, I prefer to add about 300 grams of ground limestone per $m^2$ of ground. When other lime containing compositions are used, equivalent amounts of these compositions to 300 grams of limestone per $m^2$ may be employed. The exact quantity of the lime-containing compound which may be used can be determined by measuring the soil pH or hydrogen ion values using, for example, the Schachtschabel method or pH meters or any conventional soil analysis or measuring system. With other agents, of course, the alkali equivalent to the recited limestone quantities may be used.

When part of the lime compound is to be replaced by an analogous magnesium compound, I prefer to use dolomite rock, magnesium carbonate-limestone mixtures, magnesium marly limestone, magnesium-burnt lime compositions and magnesium slaked lime compositions.

Pure dolomite consists substantially of 54% by weight calcium carbonate and 46% magnesium carbonate while calcium carbonates with a high magnesium content can also be used, e.g. compositions in which 55 to 85% by volume consist of calcium carbonate and 5 to 40% consist of magnesium carbonate. Magnesium carbonate lines with 60 to 80% by volume calcium carbonate and 15 to 40% magnesium carbonate can also we used. Magnesium-burnt lime consists essentially of 50 to 80% calcium oxide and 15 to 22% magnesium oxide. Magnesium slaked lime has a magnesium hydroxide content calculated as MgO in excess of 15%.

All of the aforementioned calcium and magnesium compounds and compositions can be employed in accordance with the present invention.

I can also make use of alkali reactive compounds of alkali metals themselves, preferably potassium compounds, because of the nutrient characteristics thereof. In cases in which sodium is not considered to be detrimental, sodium compounds may also be used.

Preferred alkali-reactive compounds of the latter class are potassium carbonate, potassium hydrogen carbonate or residue potassium compounds such as potassium filter dust containing potassium carbonate and sulfate, and potassium double salts. The sodium compounds which may be used are those which are the analogs to the potassium compounds previously mentioned as well as natural products such as trona ($Na_2CO_3 \cdot NaHCO_3 \cdot 2H_2O$) I have also found ammonium compounds such as ammonium carbonate and ammonium bicarbonate to be satisfactory as the alkali reactive compounds.

Synergistic effects are found with pyrophosphates whose anion has the formula $P_2O_7^{-4}$. Many salts of the pyrophosphates with polyvalent cations are typically several thousand times less water soluble than the corresponding orthophosphate salts. K. Simkiss of the English University at Reading, has discovered in snails large amounts of insoluble inorganic deposits containing pyrophosphates. The conclusion that he was able to draw was that the pyrophosphates here served to detoxify heavy metals in vivo. Apparently heavy metal pyrophosphates, for example, $Pb_2P_2O_7$ become insoluble in water especially at neutral conditions since with an excess of strong acids such compounds can be resolubilized.

Pyrophosphates are known salts of diphosphoric acids which, by heating for a prolonged period to a temperature of 200° to 300° C., are formed from phosphoric acid by the splitting off of water. Of the neutral pyro or diphosphates, only the alkali-metal and ammonium salts are water soluble. The diphosphates are formed by the heating of primary or secondary phosphates or the corresponding ammonium salts. These diphosphates form complexes with the hardening compounds of water. They are also used to eliminate colored iron compounds from wash water, to stabilize hydrogen peroxide solutions (by complexing catalytic heavy metal ion which would tend to decompose the hydrogen peroxide solution) and for other technological purposes.

Apart from pyrophosphates, the polyphosphates which may be used for the present invention are any which can ensure that the corresponding aluminum and heavy metal salts of about the same magnitude of water insolubility will be formed.

Preferably the potassium compounds of the pyro or polyphosphates are employed for the purpose of this invention, since the potassium cation is one which is washed or leached out with acid rain and thus must be replace as a nutrient. The phosphorus content of the pyro or polyphosphate also provides an important fertilizing nutrient which is required for the growth of plants. The fertilizer can include other nutrients as well to promote plant growth. For example, the nitrogen compounds such as ammonia and ammonium salts and urea may be used.

SPECIFIC EXAMPLES

The following examples represent typical applications of the present invention.

EXAMPLE 1

The following composition is applied to the soil:
75 parts by weight (ppw) of fertilizer lime (ground calcium carbonate stone)
20 ppw urea
5 ppw potassium pyrophosphate ($K_4P_2O_7$)

The lime can be applied to the ground before the other components of the composition or simultaneously therewith in admixture thereto. The composition can be varied in wide ranges depending upon the soil requirements and the degree of acidification or the particular basifying agent which is used. The amount of the composition which is employed is determined by analytic evaluation of the soil acidity and, for example, a test may be made using a conventional pH meter with a soil pH sensor as is commercially available. For each square meter of ground to be treated and for each pH unit for which the soil is to be raised, the composition given previously is added in an amount corresponding to 300 grams of limestone.

The amount of pyro of polyphosphate for binding the aluminum or heavy meat ion can also vary and is dependent upon the concentration of these contaminants in the soil.

The surprising synergistic effect of the basifying agent, here the calcium (or also the magnesium) compound with the pyro or polyphosphate capable of forming the water insoluble aluminum and heavy metal salts derives on the one hand apparently from the binding of the soil acidity which appear to reduce the release of the detrimental polyvalent elements and thus allows the pyrophosphate and polyphosphate to fully bind the toxic soil contaminants. To avoid toxic influences of such heavy metal and aluminum compounds on plants and soil bacterias it seems to be necessary that the solubility of those compounds in water must be such more reduced than those of their hydroxide and orthophosphates having an already relatively low solubility in water. The toxic ions are practically removed to zero enabling the detoxification of the soil and regeneration of plants.

The polyphosphates also appear to have a positive effect regarding peptisation, deflocculation and dispersion in the soil.

EXAMPLE 2

An important application of the principles of this invention and the compositions thereof is in the protection of ground water. The acid deposits leach from the soil into the ground water, increasing the nutrient content thereof and also the content therein of heavy metal and aluminum compounds. Such ground water contamination can result in a poisoning of the ground water and hence a reduction in the flora and fauna of bodies of water and contamination of drinking water reservoirs.

To protect the watershed areas and thereby ground water, the watershed areas can be treated with a composition consisting essentially of 98 parts ppw calcium carbonate and 2 ppw alkali diphosphate.

With this ground treatment, the filter effect of the soil on the acid contaminants is restored and the soil serves to filter out the water-insoluble aluminum and heavy metal salts which are formed.

EXAMPLE 3

The following mixture is applied to the soil:
70 ppw fertilizer lime
27 ppw potassium hydrogen carbonate
3 ppw potassium pyrophosphate.

This mixture has been found to be highly effective in the regeneration of tree growth along highways and in cities.

This fertilizer mixture appears to be especially effective in the detoxification of soil in which large accumulations of lead and other heavy metal compounds can be found, i.e. the result of heavy automotive vehicle usage. It replaces calcium compounds which are lost from the soil as a result of acid deposits. Tests have also shown that in such soil there is a reduction in the potassium level which is likewise compensated by the abovementioned mixture.

The lime component can be applied separately before the fertilization with the remaining components or as part of a three-component mixture.

Condensed phosphates such as polyphosphate, metaphosphate and ultraphosphate, have not hitherto been used in practice in fertilizers in bigger scale probably at least in part because of their high costs. Mainly, phosphates which are soluble when bound to the calcium ion have played a role in nutrient solutions for liquid fertilizers because in the parent solutions or concentrates, calcium phosphate does not precipitate respectively the polyphosphates are used as stabilizers of such liquids. Consequently, the art has turned away from uses of diphosphates and polyphosphates in accordance with the present invention.

In the soil, the condensed phosphates of the present invention will normally be hydrolyzed and, by combination with water appear to be transformed to orthophosphates which can be taken up by the plant roots.

Only the diphosphates which have several thousand times lesser water solubility in the form of their aluminum and heavy metal salts appear to remain in nonacidic soil resistant to hydrolysis. Consequently, the invention combination of alkali reactive compounds with the diphosphate or other polyphosphates which form such water insoluble aluminum and heavy metal salts is not only new but represents an approach directly contradictory to earlier techniques involving polyphosphates in fertilizers.

To the extent that trace nutrient elements are to be supplied which may include other metal elements, it can be advantageous to carry out the fertilization in such fashion that the composition of the invention including the polyphosphate will be applied to the ground and any nutrients which may have heavy metal character are applied to the leaves or needles of the plants. This minimizes the possibility that the trace metals will be tied up by the phosphate component of the fertilizer of the present invention. Another possibility is to apply these metal compounds as chelates.

Normally, however, the condensed phosphates of the invention are effective to eliminate excess polyvalent water-insoluble metal ions in the soil and this is advantageous since even natural nutrient elements such as iron and manganese are well known to be toxic in high concentrations. Consequently, excess levels of these heavy metals can be tied up as well.

Ammonia or ammonium compounds also may serve as a carrier for the alkaline medium or the phosphate. These are represented in the following examples.

EXAMPLE 4

88 parts per weight ammonium bicarbonate
10 parts per weight ammonium pyrophosphate
2 parts per weight complex metal compounds (Mg, Fe, Cu, Zn, Co)

Note that the complexing agent can be a chelating agent such as EDTA.

EXAMPLE 5

57 parts per weight of a mixture of ammonium carbonate and ammonium bicarbonate in equal parts.
13 parts by weight potassium polyphosphate
2.5 parts by weight complex metal compounds as in Example 4 plus ammonomolybdate and borax
27.5 parts by weight thermally treated lava rock meal (pumice) serving as a flow-promoting and soil-loosening agent.

EXAMPLE 6

47 parts by weight dolomite meal with a mean particle size of 10 microns
33 parts by weight ammonium bicarbonate
12 parts by weight potassium pyrophosphate
2 parts by weight trace elements
6 parts by weight potassium sulphate The dolomite meal is applied to the soil to be treated in the fall and the remaining components are applied the following spring by spraying or scattering.

I claim:

1. A method of detoxifying and deacidifying soil which has been contaminated by acid rain and is at a pH substantially below 5.6, which consists of applying to said soil:
   a pyrophosphate component consisting of at least one water-soluble pyrophosphate selected from the group which consists of potassium pyrophosphate and ammonium pyrophosphate capable of forming water-insoluble salts of aluminum and heavy metals associated with soil toxification upon subjection of the soil to acid rain and in an amount sufficient to materially detoxify the soil by combination with said aluminum and said heavy metals; and
   an alkali component consisting of at least one alkali-reaction compound selected from the group which consists of calcium carbonate, calcium oxide, calcium hydroxide, magnesium hydroxide, magnesium oxide, magnesium carbonate, capable of inducing the reaction of said pyrophosphate with said aluminum and heavy metals to produce said water-insoluble salts and in an amount sufficient to raise the pH of the soil to substantially 5.6 and to produce said water-insoluble salts in soil-detoxifying amounts, the ratio by weight of said alkali component to said pyrophosphate component being at least 4:1 and said components being applied to the ground in an amount equivalent to about 300 grams of ground limestone per $m^2$ per pH unit increase required to reach a pH of substantially 5.6, said pyrophosphate and said alkali-reactive component being applied to the soil in the form of a composition which consists essentially of:
   75 parts by weight calcium carbonate
   20 parts by weight urea
   4 parts by weight potassium pyrophosphate.

2. A method of detoxifying and deacidifying soil which has been contaminated by acid rain and is at a pH substantially below 5.6, which consists of applying to said soil:
   a pyrophosphate component consisting of at least one water-soluble pyrophosphate selected from the group which consists of potassium pyrophosphate and ammonium pyrophosphate capable of forming water-insoluble salts of aluminum and heavy metals associated with soil toxification upon subjection of the soil to acid rain and in an amount sufficient to materially detoxify the soil by combination with said aluminum and said heavy metals; and
   an alkali component consisting of at least one alkali-reactive compound selected from the group which consists of calcium carbonate, calcium oxide, calcium hydroxide, magnesium hydroxide, magnesium oxide, magnesium carbonate, capable of inducing the reaction of said pyrophosphate with said aluminum and heavy metals to produce said water-insoluble salts and in an amount sufficient to raise the pH of the soil to substantially 5.6 and to produce said water-insoluble salts in soil-detoxifying amounts, the ratio by weight of said alkali component to said pyrophosphate component being at least 4:1 and said components being applied to the ground in an amount equivalent to about 300 grams of ground limestone per $m^2$ per pH unit increase required to reach a pH of substantially 5.6, said pyrophosphate and said alkali-reactive component being applied to the soil in the form of a composition which consists essentially of:
   98 parts by weight calcium carbonate
   2 parts by weight potassium pyrophosphate.

* * * * *